US008554764B2

(12) United States Patent
Mosoi et al.

(10) Patent No.: US 8,554,764 B2
(45) Date of Patent: Oct. 8, 2013

(54) ALGORITHM AND IMPLEMENTATION FOR FAST COMPUTATION OF CONTENT RECOMMENDATIONS

(75) Inventors: Alexandru Mosoi, Bacau (RO); Paul Alexandru Chirita, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 391 days.

(21) Appl. No.: 12/626,472

(22) Filed: Nov. 25, 2009

(65) Prior Publication Data

US 2011/0072013 A1    Mar. 24, 2011

(30) Foreign Application Priority Data

Sep. 23, 2009  (EP) ..................................... 09464004

(51) Int. Cl.
*G06F 7/00* (2006.01)
*G06F 17/00* (2006.01)
(52) U.S. Cl.
USPC ........................................................ 707/722
(58) Field of Classification Search
None
See application file for complete search history.

(56) References Cited

U.S. PATENT DOCUMENTS

| | | | |
|---|---|---|---|
| 7,158,961 B1 | 1/2007 | Charikar | |
| 7,562,066 B2 | 7/2009 | Kawatani | |
| 2002/0145747 A1* | 10/2002 | Burquist et al. | 358/1.14 |
| 2003/0018617 A1 | 1/2003 | Schwedes | |
| 2005/0010555 A1 | 1/2005 | Gallivan | |
| 2005/0149576 A1* | 7/2005 | Marmaros et al. | 707/200 |
| 2005/0259844 A1* | 11/2005 | Kot et al. | 382/100 |
| 2009/0083032 A1* | 3/2009 | Jablokov et al. | 704/235 |
| 2010/0049684 A1* | 2/2010 | Adriaansen et al. | 706/46 |

OTHER PUBLICATIONS

"European Application Serial No. 09464004.2, European Search Report mailed Mar. 19, 2010", 8 Pgs.
Alexandru, M., et al., "Designing a Generic Recommendations Engine for the Adobe User Community", Universitatea politehnica din bucuresti facultatea De automatica si calculatoare, [Online]. Retrieved from the Internet: <URL: http://cs.pubso/~scs/doc/03__06__2009.pdf [retrieved on Feb. 9, 2010]>, (May 15, 2009), pp. 1-3.
Pretschner, A., et al., "Ontology based personalized search", *Tools with artificial intelligence, Proceedings, 11th IEEE international Conference*, (Nov. 9-11, 1999), 391-398.
Schreiber, F. A, et al., "Dynamic user Profiles and Flexible Queries in Office Document Retrieval Systems", Decision support systems, Elsevier Science vol. 5, No. 1, (Mar. 1, 1989), 13-28.
Wei, D., et al., "Asymmetric Distance Estimation with Sketches for Similarity Search in High-Dimensional Spaces", Proceedings of the 31st annual International ACM SIGIR Conference on Research and Development in Information, [Online]. Retrieved from the Internet: <URL: http://doi.acm.org/10.1145/1390334.1390358> [retrieved on Feb. 8, 2010], (Jul. 20, 2008), 123-130.

(Continued)

*Primary Examiner* — Taelor Kim
(74) *Attorney, Agent, or Firm* — Schwegman Lundberg Woessner P.A.

(57) ABSTRACT

In various example embodiments, a system and associated method for fast computation content recommendation is provided. A dynamic user profile for a user is determined. The dynamic user profile is based on one or more fingerprints of viewed documents by the user. One or more relevant documents are determined based on the dynamic user profile and the fingerprints of documents in the system. A list of the one or more relevant documents is then provided to the user.

13 Claims, 8 Drawing Sheets

(56) References Cited

OTHER PUBLICATIONS

"European Application Serial No. 09464004.2, Extended European Search Report mailed Mar. 19, 2010", 7 pgs.
Alexandru, M., et al., "Designing a generic recommendations engine for the Adobe user community", *Sesiunea De Comunicari Stiintifice Studentesti*[Online], (May 15, 2009), pp. 1-3.
Pretschner, et al., "Ontology Based Personalized Search", Tools with Artificial Intelligence, 1999 Proceedings. 11th IEEE International Conference, (Nov. 9, 1999), 391-398.
Schreiber, F. A, et al., "Dynamic User Profiles and Flexible Queries in Office Document Retrieval Systems", *Decision Support Systems*, Elsevier Science Publishers, Amsterdam vol. 5, No. 1., (Mar. 1, 1989), 13-28.
Wei, Dong, et al., "Asymmetric Distance Estimation with Sketches for Similarity Search in High-Dimensional Spaces", *Proceedings of the 31st Annual International ACM SIGIR Conference on Research and Development in Information Retrieval*, (Jul. 20, 2008), 123-130. http://www.google.com/search?g=related:en.wikipedia.org/wiki/History_of_the_Internet, (Accessed Aug. 25, 2009).
Ackerman, Rich , "Vector Model Information Retrieval", [Online]. Retrieved from the Internet: <URL: http://www.hray.com/5264/math.htm>,(Sep. 25, 2003), 16 pgs.
Balabanovic, Marko , "An adaptive Web page recommendation service", *Proceedings of the First International Conference on Autonomous Agents*, (1997), 378-385.
Baluja, Shumeet , et al., "Video suggestion and discovery for youtube: taking random walks through the view graph", *Proceeding of the 17th International Conference on World Wide Web*, (2008), 895-904.
Broder, A. Z., "Identifying and Filtering Near-Duplicate Documents", *Combinatorial Pattern Matching, Lecture Notes in Computer Science*, (2000), 1-10.
Das, Abhinandan S., et al., "Google news personalization: scalable online collaborative filtering", *Proceedings of the 16th International Conference on World Wide Web*, (2007),271-280.
Green, S. J., "Building Hypertext Links by Computing Semantic Similarity", *IEEE Transactions on Knowledge and Data Engineering*, 11(5), (Sep.-Oct. 1999),713-730.
Huerta, Juan , "Vector based Approaches to Semantic Similarity Measures", [Online]. Retrieved from the Internet: <URL: http://www.cicling.org/2008/RCS-vol-33/13-Huerta.pdf>,(Jan. 29, 2008),11 pgs.

* cited by examiner

POSTED BY CRYPTODUDE 2006-10-18 11.08.17 0
AVG. RATING OF 3.72

Title

A 3-state checkbox in a TreeItemRenderer

Problem

Trees are commonly used to represent file system Often the user needs to select several items within several folders and take an action (copy, delete, print, ...) on them, so, there needs to be some visual mechanism for indicating that a node is selected. A checkbox is typically used to represent selection. What we need is a tree of 3-state checkboxes.

Solution

There are three main aspects to the solution: 1. A TreeItemRenderer is created to place a CheckBox control at each node in the tree. 2. An image of a tiny black box is painted on top of the CheckBox when the CheckBox is in the third state. 3. The underlying data model for the tree needs to contain an attribute representing the state of the CheckBox.

Detailed Explanation

Selection/de-selection of a parent node should cause children nodes to be selected/de-selected. In the case that a parent node has some children that are selected and some that are not selected, a simple 2-state check box won't do – this third state (where some of the children of a node are selected and some are not) cannot be represented by the selected property of a check box, which is a Boolean.
The solution lies in the implementation of the TreeItemRenderer class. I have created an ActionScript called CheckTreeRenderer for this purpose.

TECHNOLOGIES
FLEX AIR FLASH COLDFUSION

TAGS

COMPONENTS

RELATED RECIPES

Checkbox 3 state sephiroth
Rating: 3.15
Similarity: 1.77

Delete a node from XML / XMLListCollection

Born2code
Rating: 2.53
Similarity: 1.70

Tree.getDisplayIndex()

sengung1234
Rating: 2.91
Similarity: 1.69

[handle the tree items]

Giorgio Natili
Rating: 3.31
Similarity: 1.59

*FIG. 7*

ALGORITHM AND IMPLEMENTATION FOR FAST COMPUTATION OF CONTENT RECOMMENDATIONS

CLAIM OF PRIORITY

The present patent application claims the priority benefit of the filing date of European Application (EPO) No. 09464004.2 filed Sep. 23, 2009, the entire content of which is incorporated herein by reference.

TECHNICAL FIELD

The present application relates generally to the field of computer technology and, in a specific example embodiment, to a system and method for fast computation content recommendation.

BACKGROUND

Conventional content recommendation systems for users accessing a document can be classified into content-based systems and collaborative filtering systems. In content-based filtering systems, content recommendations are pre-computed and thus are static in manner. That is, documents that may be related or of interest to a currently viewed document are typically determined offline and provided to a user when the user visits a site. The recommendations do not take a user's preferences into consideration.

Collaborative filtering systems take into consideration what other users find to be relevant. For example, for each piece of content, a set of other content that other users also viewed is suggested. Unfortunately, what one user considers to be relevant may not be considered relevant by another user.

A combination of both content-based and collaborative filtering systems may also be conventionally used. In these systems, content may be ranked based on factors such as hyperlinks between content, query language, geographical location of the users, and so forth.

BRIEF DESCRIPTION OF DRAWINGS

Various ones of the appended drawings merely illustrate example embodiments of the present invention and cannot be considered as limiting its scope.

FIG. 7 is an example graphical interface for displaying requested content and providing content recommendations.

DETAILED DESCRIPTION

The description that follows includes illustrative systems, methods, techniques, instruction sequences, and computing machine program products that embody the present inventive subject matter. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

Example embodiments provide a system and method for fast computation content recommendation. In example embodiments, a user profile is determined for a user. The user profile is based on one or more fingerprints of documents viewed by the user. Using a processor, one or more relevant documents are determined based on the determined user profile. The relevant documents may be determined using a cosine product estimation of fingerprints associated with both available documents and the user profile. A list of the one or more relevant documents may then be presented to the user. By using document fingerprints, an updated user profile, and a cosine product estimation process, highly relevant content recommendations may quickly (e.g., requiring less processing time and bandwidth than conventional systems) be provided to the user. It should be understood that while example embodiments discuss the use of documents, documents may represent any form or type of content and is not limited to textual or print embodiments.

Figure 1:
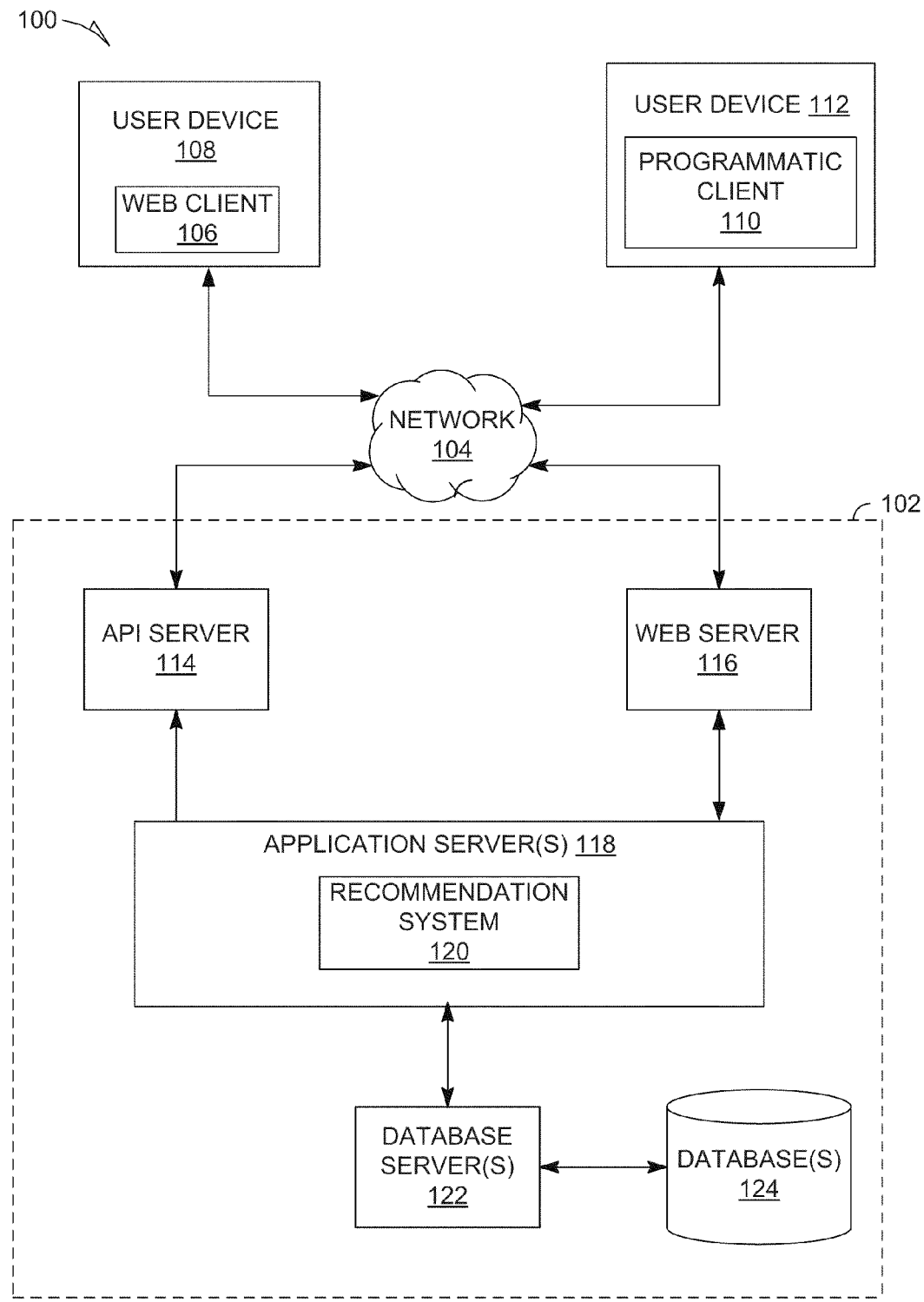
FIG. 1 is a block diagram illustrating an example embodiment of a high-level, client-server-based network architecture of a system used to provide fast computation content recommendation.

With reference to FIG. 1, an example embodiment of a high-level client-server-based network architecture 100 for fast computation content recommendation is provided. A networked system 102, in an example form of a network-server-side functionality, is coupled via a network 104 (e.g., the Internet or Wide Area Network (WAN)) to one or more clients. FIG. 1 illustrates, for example, a web client 106 operating via a browser (e.g., such as the Internet Explorer® browser) on a user device 108 (e.g., a display device). Additionally, a programmatic client 110 may execute on another user device 112. It is noted that the user device 108 may include a programmatic client or the user device 112 may include a web client.

An Application Program Interface (API) server 114 and a web server 116 are coupled to, and provide programmatic and web interfaces respectively to, one or more application servers 118 at the networked system 102. The application servers 118 host a recommendation system 120, which may comprise one or more modules, applications, or engines, each of which may be embodied as hardware, software, firmware, or any combination thereof. The application servers 118 are, in turn, coupled to one or more database servers 122 facilitating access to one or more database(s) or storage devices 124. The databases 124, in one embodiment, store documents (e.g., content) and data associated with the documents (e.g., calculated fingerprints). Fingerprints will be discussed in more detail below.

The recommendation system 120 provides a number of recommendation functions and services to users that access the networked system 102 to obtain content. The recommendation system 120 is discussed in more detail in connection with FIG. 2.

While the example architecture 100 of FIG. 1 employs a client-server architecture, a skilled artisan will recognize that the present disclosure is not limited to such an architecture. The example architecture 100 can equally well find application in, for example, a distributed or peer-to-peer architecture system. The recommendation system 120 may also be implemented as standalone systems or standalone software programs operating under a separate hardware platform, which do not necessarily have networking capabilities.

Figure 2:
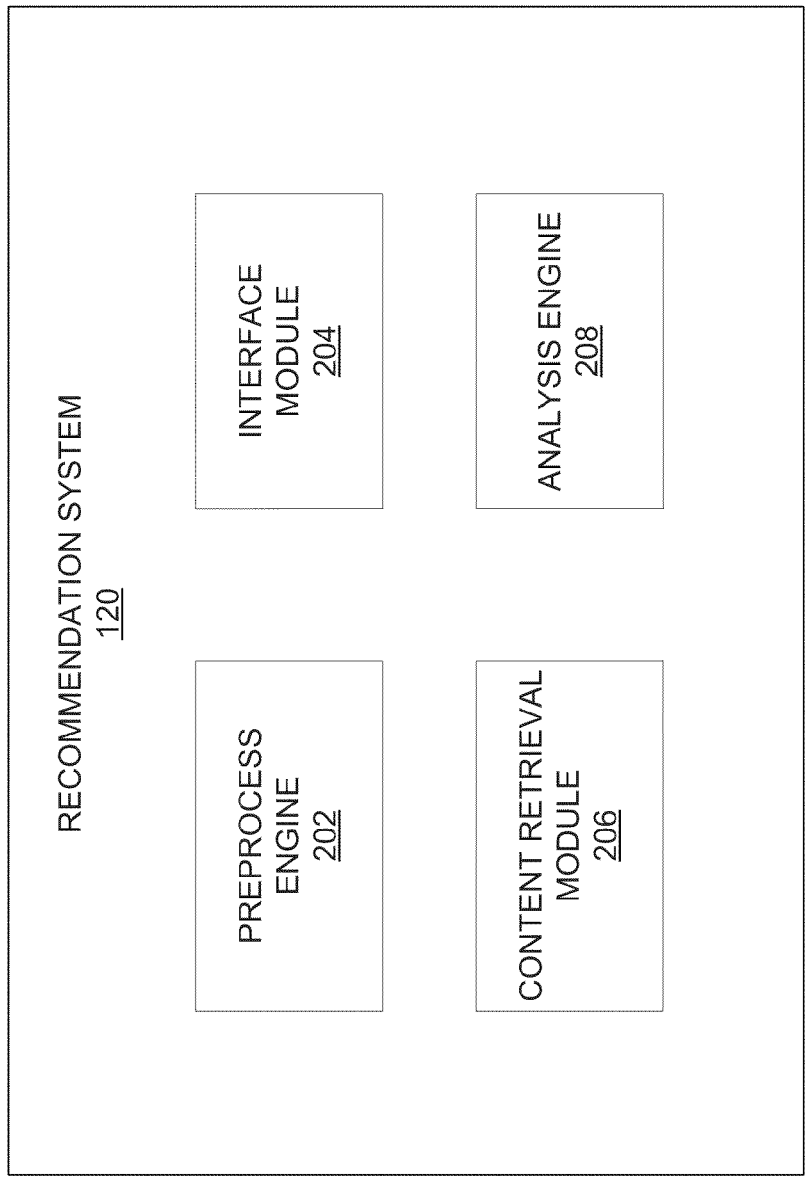
FIG. 2 is a block diagram illustrating an example embodiment of a recommendation system of the network architecture of FIG. 1.

FIG. 2 is a block diagram illustrating an example embodiment of the recommendation system 120 of the network architecture of FIG. 1. The recommendation system 120 comprises a preprocess engine 202, an interface module 204, a content retrieval module 206, and an analysis engine 208. Alternative embodiments may comprise more, less, or functionally equivalent modules or engines in various combinations. While certain modules or engines are described as performing certain operations, these descriptions are merely examples and the operations may be performed by other components or systems.

In example embodiments, the preprocess engine 202 determines a fingerprint for each content or document available in one or more databases (e.g., databases 124). A fingerprint is a hash function that is applied on a vector that outputs a number of bits. For example, the vector may comprise a vector of words or features that represent the document. In one embodiment, an N-dimensional vector may be used whereby a value in each dimension is equal to a frequency of a word (e.g., how often the word appears in the document). The preprocess engine 202 will be discussed in more detail in connection with FIG. 3.

The interface module 204 provides a user interface to the user. In one embodiment, the interface module 204 also functions as a front-end module which generates a small Hyper-Text Markup Language (HTML) snippet which displays a list of recommended documents on the user device. Accordingly, a user may be directed to a random document when a user profile of the user is clean (e.g., session initiation). After accessing a document, the user profile is updated to reflect the accessed document and the user is presented with the list of recommended documents by the interface module 204. If the user selects one of the recommended documents, the interface module 204 may further log the selection and redirects the user to a corresponding redirect service Uniform Resource Locator (URL). In one embodiment, the interface module 204 may also store a user fingerprint of the user profile in a user cookie having a predetermined lifespan (e.g., 15 minutes) in order to track the user's behavior and preferences. The user profile and user fingerprint will be discussed in more detail in connection with FIG. 4 below.

The content retrieval module 206 provides the request content or document to the user. In example embodiments, the content retrieval module 206 receives a request for particular content. The content retrieval module 206 then accesses one or more databases (e.g., databases 124) to retrieve the content and provide the content to the requesting user.

In example embodiments, the analysis engine 208 determines one or more relevant documents to recommend to the user. The recommendation is based, in part, on the dynamically updated user profile and user fingerprint associated with the user. Each time the user views or accesses another document, the user profile is updated to reflect the accessed document. The analysis engine 208 will be discussed in more detail in connection with FIG. 3.

Figure 3:
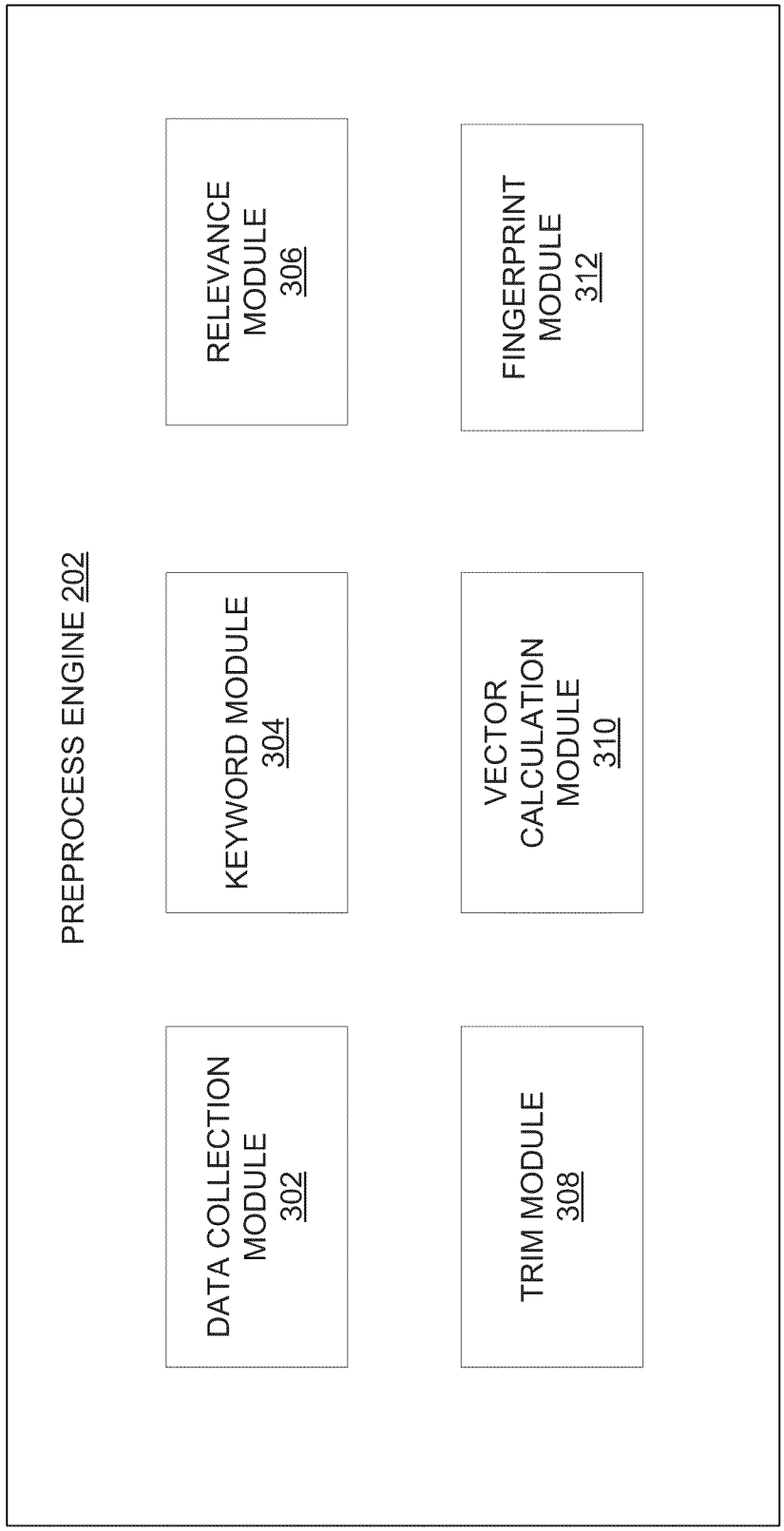
FIG. 3 is a block diagram illustrating an example embodiment of a preprocess engine.

FIG. 3 is a block diagram illustrating an example embodiment of the preprocess engine 202 of the recommendation system 120. The preprocess engine 202 performs off-line computation that is later used by the recommendation system 120 to determine near real-time content recommendations for the user. The preprocess engine 202 may comprise a data collection module 302, a keyword module 304, a relevance module 306, a trim module 308, a vector calculation module 310, and a fingerprint module 312. Alternative embodiments may comprise more, less, or functionally equivalent modules in various combinations.

The data collection module 302 collects data from each document or content. In example embodiments, the data collection module 302 extracts a URL, a title, an author, and a Bayesian rating from each of the documents. The extracted information may then be stored for later use.

The keyword module 304 parses a document and extracts keywords. A keyword (K) can be anything characteristic to the document (e.g., tag, word, phrase). In one embodiment, the keyword module 304 first splits the document into sentences using a simple regular expression. For example, a paragraph may read:

The second half and in 2009, we're going to see a lot more deterioration. This is just the beginning. There are some clear-cut trends among companies that are struggling the most, including the ones below.

The paragraph may be split into the following sentences:

The second half and in 2009, we're going to see a lot more deterioration.

This is just the beginning.

There are some clear-cut trends among companies that are struggling the most, including the ones below.

Then, each sentence is split into lowercase words delimited by spaces. For example:

the second half and in 2009 we're going to see a lot more deterioration this is just the beginning there are some clear-cut trends among companies that are struggling the most including the ones below Next, punctuation, numbers, and noise words are removed. Noise words are typically the most common words in a language. Example English noise words include the, I, it, me, and, a, an, to, he, she. Continuing with the example, the removal of the punctuation, numbers, and noise words result in:

second half deteriorations beginning clear-cut trends companies struggling including Because a word can have different forms (e.g., gerund or plural) that all refer to a similar concept, the words resulting from the previous step are stemmed. In one embodiment, the stemming is performed using a Porter stemming algorithm. The result will be:

second half deterioar begin clear-cut trend company struggl include

Furthermore, consecutive words give a better representation of a concept of a document. Therefore, the extracted keywords are 1-gram, 2-gram, 3-gram, 4-gram, and 5-gram words from each sentence. For example, chang_background is more relevant for a document than only chang or background and helps discriminate between documents about changing the background and documents about changing the contents of the window in the background. Applying this to the example:

second half deterioar second_half half_deterioar second_half_deterioar begin clear-cut trend company struggl include company_ strugl . . .

Finally, the keyword module 304 removes keywords that are present in only a few documents. Because many sentence fragments are not actually meaningful concepts (e.g., second_half_deterioar) but some random association which is unlikely to appear anywhere else, removing such keywords increases quality of similarity between documents.

In some embodiments, the keyword module 304 treats code differently from text. Code typically is more verbose and carries less semantics. Therefore, the keyword module 304 treats a sentence as a single line of source and no stemming is performed. After processing of a code fragment by the keyword module 304, usually a function name remains. Because keywords from a code carry less semantics, their relevance may be adjusted (e.g., to one third).

The relevance module 306 determines relevance of keywords ($v_K$). The relevance of a keyword may be a real positive number specifying a degree of importance the keyword has in describing the document. If a keyword is unrelated to a document, then its relevance is $v_K=0$ and can be removed from the document representation.

In its simplest form, the relevance module 306 is configured to determine relevance of a keyword based on a number of occurrences of the keyword in the document divided by a number of keywords in the document. Generally, noise words are ignored by the relevance module 306. Additionally, weighting may be decreased for keywords that are very frequent in a collection of documents. Furthermore, some embodiments may consider position of a keyword in text. For example, relevance of keywords extracted from a title may be increasingly weighted to reflect the fact that these keywords contain more semantic information than keywords from a body of the document.

The trim module 308 trims redundant keywords. It should be noted that in some embodiments, the functionality of the trim module 308 may be combined with the functionality of the keyword module 304, relevance module 306, or both.

The vector calculation module 310 calculates a document vector for each document. The document vector is a feature vector which is a collection of (keyword, relevance) pairs. In one embodiment, the document vector may be represented as:

$$\vec{v} \triangleq \{K_1 : v_{K1}, K_2 : v_{K2}, \ldots \}.$$

The fingerprint module 312 determines a fingerprint based on the document vector. A fingerprint is a hash function that is applied on the document vector that outputs a number of bits. In accordance with one embodiment, the fingerprint may be determined based on randomly generated hyper-planes (e.g., 3072 randomly generated planes). Generating a random plane, $\gamma$, may be equivalent to generating a random vector, $\vec{n}_\gamma$, normal to the plane. The side of the random plane, $\gamma$, on which an arbitrary vector $\vec{v}$ lies, $h_\gamma(\vec{v})=\pm 1$, is induced by an angle between $\vec{v}$ and the normal vector, $\vec{n}_\gamma$. If the angle is lower than $\pi/2$ then $\vec{v}$ lies on a plus side of the plane, otherwise $\vec{v}$ lies on a minus side. $h_\gamma(\vec{v})$ can be expressed, in one embodiment, as:

$$h_\gamma(\vec{v}) = \text{sign}(\cos\angle(\vec{n}_\gamma, \vec{v}))$$
$$= \text{sign}(\|\vec{n}_\gamma\| \cdot \|\vec{v}\| \cdot \cos\angle(\vec{n}_\gamma, \vec{v}))$$
$$= \text{sign}(\vec{n}_\gamma, \vec{v})$$

The property of the hash functions to return uniform random distributed numbers may be exploited to compute $n_{\gamma,K}$:

$$n_{\gamma,K} = \text{hash}(SEED_{\gamma,K}) \in (-1,+1)$$

where $SEED_\gamma$ is an arbitrary number unique to each plane. Since the values of $v_K$ are positive, it is important that the values of $n_{\gamma,K}$ contain both negative and positive numbers, otherwise every vector will be on the same side of each plane.

Finally, the value of $h_\gamma(\vec{v})$ may be approximated by:

$$h_\gamma(\vec{v}) = \text{sign}\left(\sum_{K \in \text{set of keywords from } \vec{v}} \text{hash}(SEED_{\gamma,K}) \cdot v_K\right)$$

Then for a vector, $\vec{v}$, a fingerprint may be computed of N bits (e.g., based on N random SEEDs corresponding to N random planes). In one embodiment, the fingerprint may be calculated as follows:

$$fp(\vec{v}) = \overline{h_{\gamma 1}(\vec{v}) > 0, h_{\gamma 2}(\vec{v}) > 0, \ldots, h_{\gamma N}(\vec{v}) > 0}$$
$$= \overline{fp_1(\vec{v}), fp_2(\vec{v}), \ldots, fp_N(\vec{v})}.$$

Figure 4:
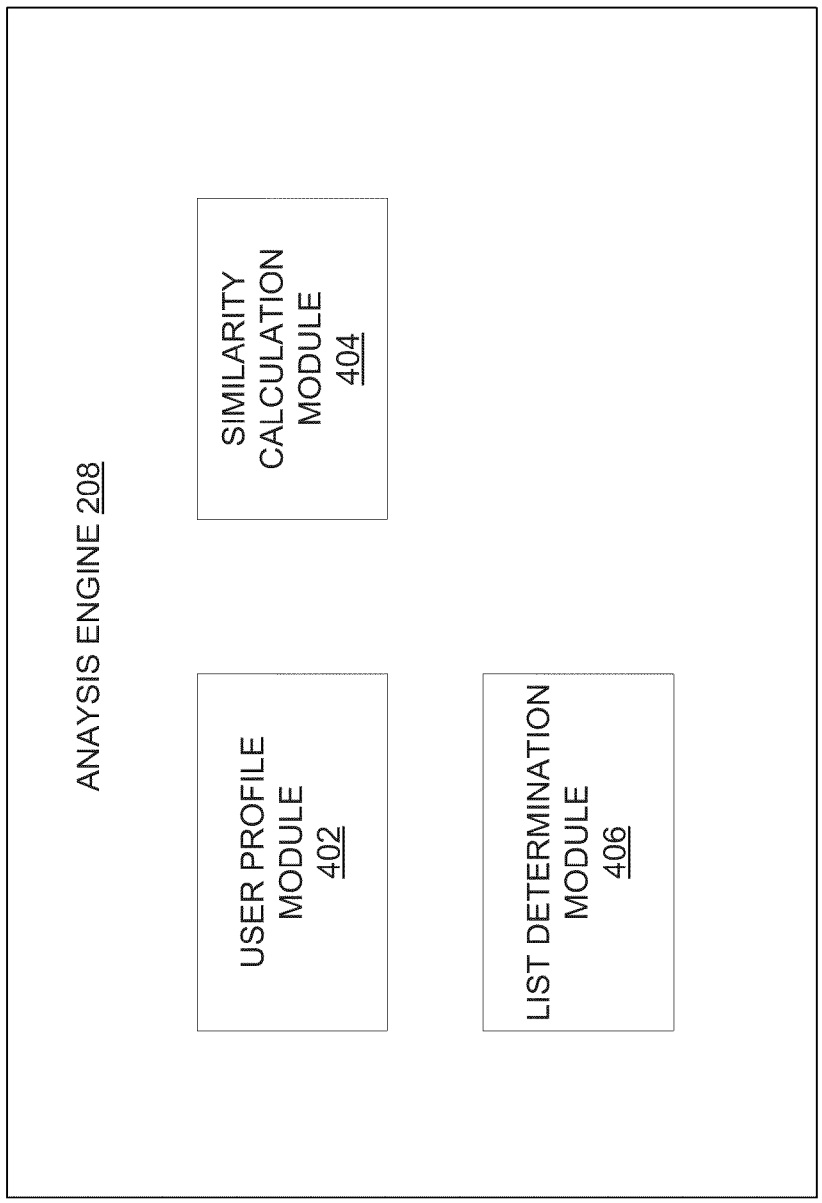
FIG. 4 is a block diagram illustrating an example embodiment of an analysis engine.

FIG. 4 is a block diagram illustrating an example embodiment of the analysis engine 208. The analysis engine 208 determines and recommends relevant documents. In one embodiment, the analysis engine 208 comprises a user profile module 402, a similarity calculation module 404, and a list determination module 406. Alternative embodiments may comprise more, less, or functionally equivalent modules in various combinations.

The user profile module 402 maintains a user profile associated with a user accessing content. The user is represented by two components: (1) a set of visited articles or documents and (2) a set of relevant keywords from a browsing history (e.g., from a current browsing session). The set of visited documents may be stored or otherwise associated with the user profile. The user profile may, in one embodiment, also comprise a vector of relevant keywords or features from the browsing history. The set of relevant keywords for the user can be represented as a user feature vector similar to a document vector.

$$\vec{v} \triangleq \{K_1 : u_{K1}, K_2 : u_{K2}, \ldots \}.$$

One method to represent the user profile is to encode a fingerprint of the user feature vector. After a user accesses a new document, $\vec{d}$, the user profile is probabilistically updated to reflect a new set of relevant keywords or features. The user profile may be approximated by $\vec{u} \, o_\psi \, \vec{d} \triangleq $ a vector $\vec{\bullet}$ such that with probability $\psi \, h_\gamma(\vec{\bullet}) = h_\gamma(\vec{u})$ otherwise $h_\gamma(\vec{\bullet}) = h_\gamma(\vec{d})$ where $\gamma$ is a random plane. A user fingerprint resulting from the approximated user profile, may be up to five times smaller than an encoded user profile vector in accordance with example embodiments. It should be noted that the fingerprint calculation discussed above with respect to a document vector may equally be applicable to a user profile in order to generate a user fingerprint from the user feature vector. In example embodiments, the user profile may further comprise other user data (e.g., name, age, gender) in addition to the list of viewed documents and the user feature vector and fingerprint.

Computing a cosine distance between the user profile and each document at run-time (e.g., online) would result in a slow process. As such, the similarity calculation module 404 determines recommended content based on estimates of a cosine distance between two vectors (e.g., a document vector and a user feature vector) by using fingerprints of the documents and the user profile.

In example embodiments, relevancy may be determined by counting a number of bits between two fingerprints (e.g., document fingerprint and user fingerprint) based on the vectors lying on a same side of a random plane. The probability that two vectors lie on the same side of the plane can be estimated using a relative frequency. This estimation may be represented as:

$$Pr[\vec{u} \sim_\gamma \vec{v}] \approx p = \frac{\text{\# of times the } \vec{u} \text{ and } \vec{v} \text{ lie on the same side}}{\text{\# of experiments}}$$

For example, if from 900 planes the two vectors lie on the same side of 600 of the planes, then the angle between the two vectors can be approximated as $$\angle(\vec{u}, \vec{v}) \approx \pi \cdot \left(1 - \frac{600}{900}\right) = \frac{\pi}{3}.$$

Given two fingerprints (e.g., document fingerprint and user fingerprint) as discussed above, the estimation may be represented as $$Pr[\vec{u} \sim_\gamma \vec{v}] \approx fp(\vec{u}) \oplus fp(\vec{v}) \triangleq \frac{\sum_{i=1}^{N} fp_i(\vec{u}) \cdot fp_i(\vec{v})}{N}$$

Given that $$Pr[\vec{u} \sim_\gamma \vec{v}] = 1 - \frac{\angle(\vec{u}, \vec{v})}{\pi},$$

an estimation of the cosine distance may be represented as:

$$\cos \angle(\vec{u}, \vec{v}) \approx \cos(\pi \cdot fp(\vec{u}) \oplus fp(\vec{v})).$$

It is noted that the fingerprint encodes only a direction of the vector and not its magnitude.

By performing an estimation using a current user fingerprint (based on a current user profile) with available documents, the most relevant documents may be determined. An N number of the most relevant documents may then be selected by the list determination module 406 for display to the user. N may be a predetermined number (e.g., five or ten).

Figure 5:
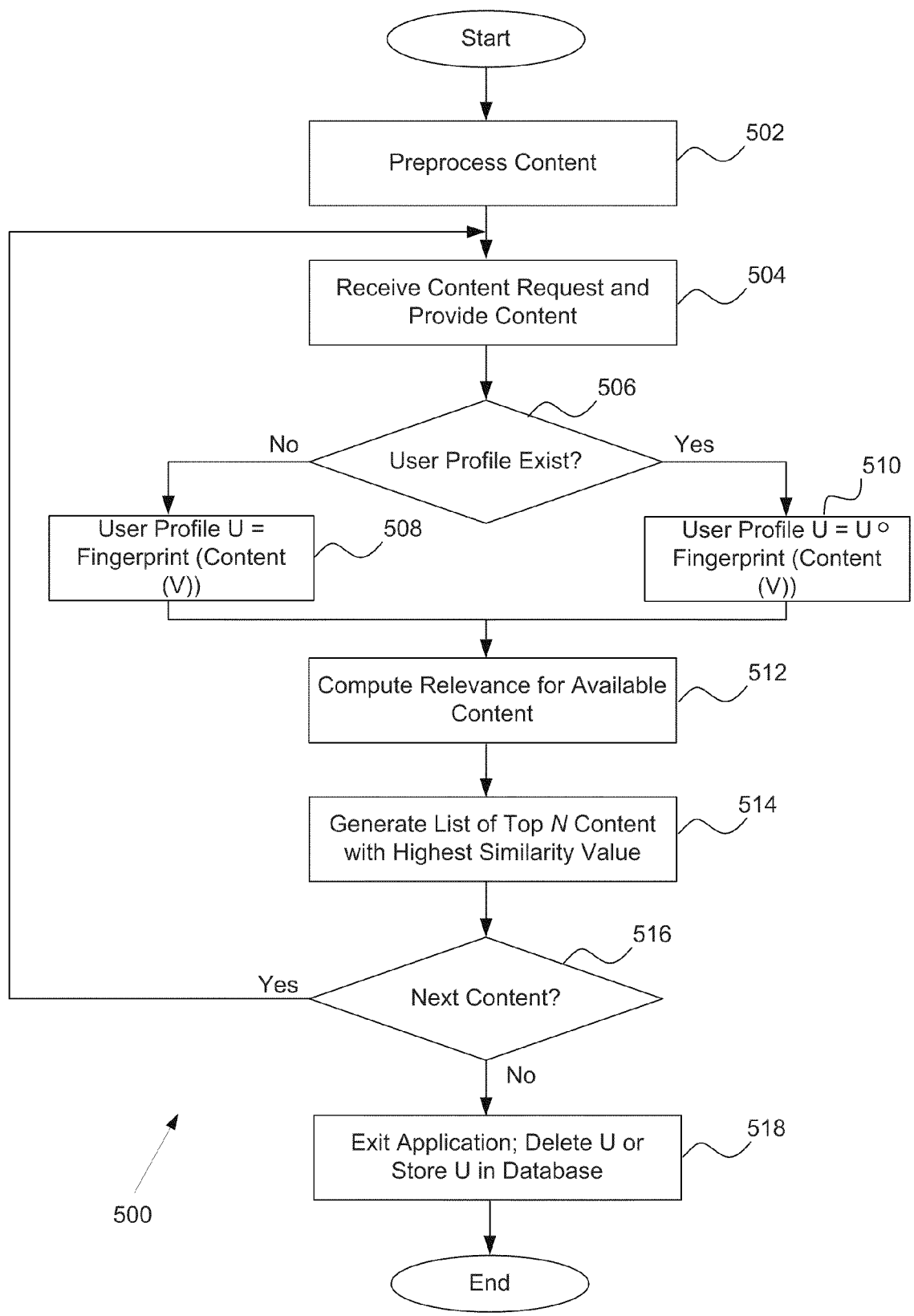
FIG. 5 is a flowchart illustrating an example method for determining content recommendations.

FIG. 5 is a flowchart illustrating an example method 500 for determining content recommendations. At operation 502, content is preprocessed (e.g., document fingerprints are pre-computed). In example embodiments, fingerprints are calculated as discussed above for each document by the fingerprint module 312. The document fingerprint is then stored to a database for later use. It should be noted that the preprocessing may occur offline, thus ensuring that the recommendation processing (e.g., the rest of the method 500) occurring online may be performed in an expedited manner.

At operation 504, a request for content is received and, in response, the content is provided to the user. In example embodiments, an interface module 204 may receive the request. Subsequently, the content retrieval module 206 retrieves the document from a database and provides the document (e.g., via the interface module 204) to a browser associated with a requesting user.

A determination is performed at operation 506 as to whether a user profile exists. If the retrieved document is the first document retrieved (e.g., session just began), then the user profile (e.g., a user feature vector) is set equivalent to the fingerprint of the retrieved document at operation 508. However, if the user profile already exists (e.g., user has already viewed one or more documents), then the user profile is updated at operation 510 by appending or otherwise incorporating the fingerprint of the retrieved document to the existing user profile. In example embodiments, the user profile module 402 updates the user profile and user fingerprint.

At operation 512, relevance for available content is computed. In example embodiments, the similarity calculation module 404 will estimate a cosine distance between a user fingerprint of the current user profile determined in operation 508 or 510 and fingerprints of all available documents. It should be noted that previously viewed documents (e.g., as recorded in the user profile) may be omitted from this operation as it is unlikely that the user will want to re-view a previously viewed document.

A list of a top N numbers of content with the highest similarity or relevance value is generated at operation 514. In example embodiments, the list determination module 406 will select the top N more relevant documents and provide a list to a browser (e.g., via the interface module 204) associated with the requesting user.

At operation 516, a determination is made as to whether a new content request is received. If the user requests a new content (e.g., selecting one of the relevant documents from the list), then the method 500 returns to operation 504. However, if there is no further request (e.g., the session ends), then the application is exited at operation 518. The user profile may then be deleted or stored in a database for future use.

Figure 6:
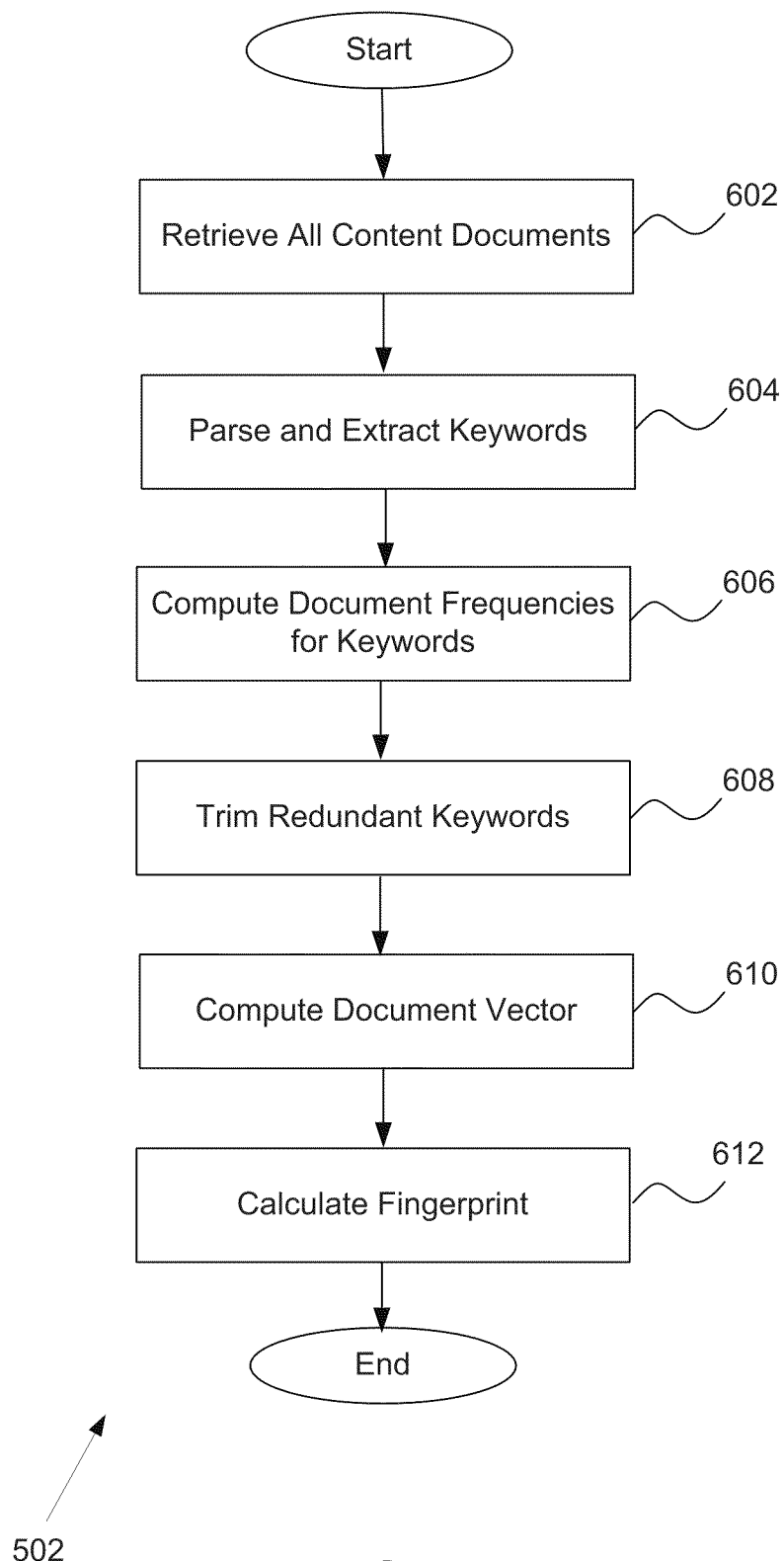
FIG. 6 is a flowchart illustrating an example method for preprocessing the content documents.

FIG. 6 is a flowchart illustrating an example method (e.g., operation 502) for preprocessing the content is provided. At operation 602, all content documents are retrieved or accessed by the preprocessing engine 202. In example embodiments, the data collection module 302 extracts a URL, a title, an author, and a Bayesian rating from each of the documents. The extracted information may then be stored.

At operation 604, the document is parsed and keywords are extracted. In example embodiments, the keyword module 304 parses each document and extracts the keywords. The keyword module 304 may remove keywords that are present in only a few documents.

Document frequencies for keywords are computed in operation 606. In example embodiments, the relevance module 306 determines frequencies of keywords ($v_K$). The relevance or frequency of a keyword may be a real positive number specifying a degree of importance the keyword has in describing the document. In its simplest form, the relevance module 306 is based on a number of occurrences of the keyword in the document divided by a number of keywords in the document. Noise words may be ignored, while weighting may decrease keywords that are very frequent in a collection of documents.

At operation 608, redundant keywords are trimmed. The trim module 308 may trim these redundant keywords.

A document vector is then computed in operation 610. The vector calculation module 310 may calculate the document vector for each document. In one embodiment, the document vector may be represented as $\vec{v} \triangleq \{K_1 : v_{K1}, K_2 : v_{K2}, \ldots\}$.

At operation 612, the fingerprint is calculated based on the document vector. In accordance with one embodiment, the fingerprint may be determined based on randomly generated planes by the fingerprint module 312.

It is appreciated that the methods of FIG. 5 and FIG. 6 are examples. Alternative embodiments may comprise more, less, or functionally equivalent steps. Additionally, the steps of the various methods may be practiced in a different order.

FIG. 7 is an example graphical user interface for displaying requested content and providing content recommendations. As shown, the requested content is displayed on a main portion of the graphical user interface. A list of the most relevant recommended documents is provided along a right side (e.g., shown circled) of the graphical user interface. The list may comprise a link to access the recommended documents. Additionally in one embodiment, a similarity value may be displayed on the list.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module or engine may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
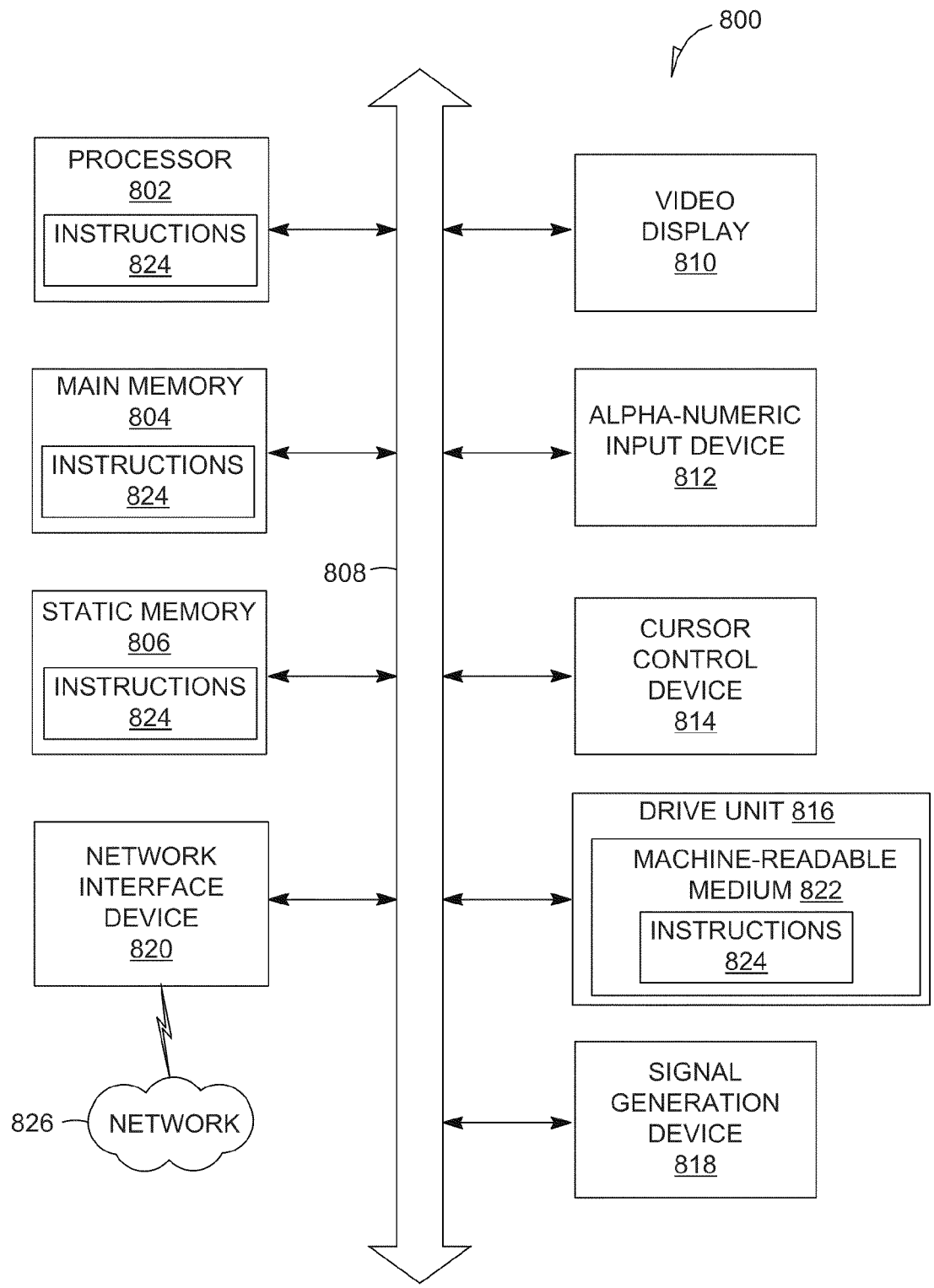
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   preprocessing documents to determine a fingerprint for each document, the determining of a fingerprint for each document including:
   determining a document vector based on features of the respective document, the document vector including keyword and relevance pairs with regard to keywords appearing in the respective document, the relevance indicating a degree of relevance of a respective keyword within the respective document, the relevance determined by dividing a number of occurrences of the respective keyword within the respective document by a total number of keywords appearing in the respective document, and the document vector including a number N-dimensions equal to the number of keywords in the respective document; and
   applying a hash function on the document vector to obtain a hash value for each of N-dimensions, each hash value equal to a frequency of a keyword of a respective dimension;
   determining a dynamic user profile for a user, the dynamic user profile being based on one or more fingerprints of viewed documents by the user and a set of relevant keywords collected from documents in a browsing history of the user;
   determining one or more relevant documents, using a processor, based on the dynamic user profile in view of the determined document fingerprints;
   wherein the determining the one or more relevant documents comprises performing a cosine product approximation between a user fingerprint associated with the dynamic user profile and fingerprints of all available documents; and
   providing a list of the one or more relevant documents.

2. The method of claim 1, wherein the determining the user profile comprises updating the dynamic user profile with a fingerprint of a current document being accessed.

3. The method of claim 1, further comprising clearing the dynamic user profile upon a completion of a session.

4. The method of claim 1, further comprising storing the dynamic user profile upon completion of a session.

5. The method of claim 1, further comprising:
   receiving a selection of a next document to access;
   updating the dynamic user profile with fingerprint data of the next document;
   determining one or more relevant documents, using a processor, based on the updated user profile; and
   providing a list of the one or more relevant documents based on the updated user fingerprint.

6. The method of claim 1, further comprising storing a user fingerprint associated with the user profile in a cookie.

7. A system comprising:
   at least one memory device and at least one processor;
   a preprocessing engine stored in the at least memory and executable by the at least one processor to pre-process documents to determine a fingerprint for each document, the determining of the fingerprint for each document including:
   determining a document vector based on features of the respective document, the document vector including keyword and relevance pairs with regard to keywords appearing in the respective document, the relevance indicating a degree of relevance of a respective keyword within the respective document, the relevance determined by dividing a number of occurrences of the respective keyword within the respective document by a total number of keywords appearing in the respective document, and the document vector including a number N-dimensions equal to the number of keywords in the respective document; and applying a hash function on the document vector to obtain a hash value for each of N-dimensions, each hash value equal to a frequency of a keyword of a respective dimension;

a user profile module stored in the at least memory and executable by the at least one processor to determine a dynamic user profile for a user, the dynamic user profile being based on one or more fingerprints of viewed documents by the user and a set of relevant keywords collected from documents in a browsing history of the user;

a similarity calculation module stored in the at least memory and executable by the at least one processor to determine one or more relevant documents, using a processor, based on the dynamic user profile in view of the determined document fingerprints;

wherein the determining the one or more relevant documents comprises performing a cosine product approximation between a user fingerprint associated with the dynamic user profile and fingerprints of all available documents; and a list determination module stored in the at least memory and executable by the at least one processor to provide a list of the one or more relevant documents to the user.

8. The system of claim 7, wherein the user profile module further updates the user profile with a fingerprint of a current document being accessed by the user.

9. The system of claim 7, further comprising an interface module to generate a small HTML snippet which displays the list of the one or more relevant documents on the user.

10. A non-transitory machine-readable storage medium in communication with at least one processor, the machine-readable storage medium storing instructions which, when executed by the at least one processor, performs a method, the method comprising:

preprocessing documents to determine a fingerprint for each document, the determining of a fingerprint for each document including:

determining a document vector based on features of the respective document, the document vector including keyword and relevance pairs with regard to keywords appearing in the respective document, the relevance indicating a degree of relevance of a respective keyword within the respective document, the relevance determined by dividing a number of occurrences of the respective keyword within the respective document by a total number of keywords appearing in the respective document, and the document vector including a number N-dimensions equal to the number of keywords in the relevant document; and applying a hash function on the document vector to obtain a hash value for each of N-dimensions, each hash value equal to a frequency of a keyword of a respective dimension;

determining a dynamic user profile for a user, the dynamic user profile being based on one or more fingerprints of viewed documents by the user and a set of relevant keywords collected from documents in a browsing history of the user;

determining one or more relevant documents, using a processor, based on the dynamic user profile in view of the determined document fingerprints;

wherein the determining the one or more relevant documents comprises performing a cosine product approximation between a user fingerprint associated with the dynamic user profile and fingerprints of all available documents; and providing a list of the one or more relevant documents to the user.

11. The non-transitory machine-readable storage medium of claim 10, wherein the determining the dynamic user profile comprises updating the dynamic user profile with a fingerprint of a current document being accessed by the user.

12. The non-transitory machine-readable storage medium of claim 10, wherein the method further comprises clearing the dynamic user profile upon a completion of a session.

13. The non-transitory machine-readable storage medium of claim 10, wherein the method further comprises:
receiving a selection of a next document to access;
updating the dynamic user profile with fingerprint data of the next document;
determining one or more relevant documents, using a processor, based on the updated user profile; and
displaying a list of the one or more relevant documents based on the updated user fingerprint.

* * * * *